Sept. 21, 1926. H. BRIERE ET AL 1,600,619
SAWING MACHINE
Filed March 28, 1925
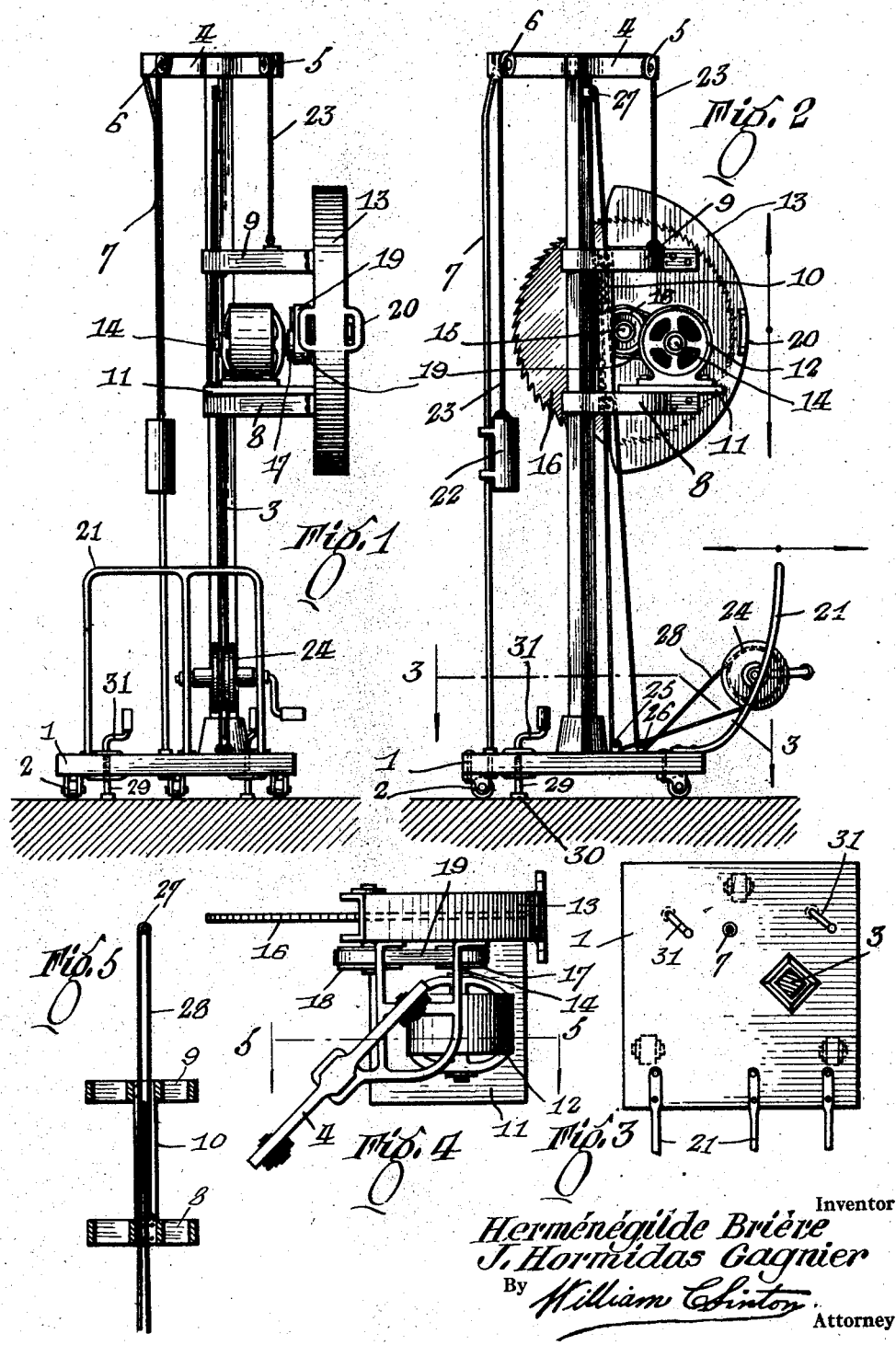
Inventor
Herménégilde Brière
J. Hormidas Gagnier
By William Clinton
Attorney Patented Sept. 21, 1926.

1,600,619

UNITED STATES PATENT OFFICE.

HERMENEGILDE BRIERE AND JOSEPH HORMISDAS GAGNIER, OF MONTREAL, QUEBEC, CANADA.

SAWING MACHINE.

Application filed March 28, 1925. Serial No. 19,164.

The present invention pertains to a novel sawing machine designed particularly for use in abattoirs to split the backbone of a carcass.

The principal object of the invention is the provision of a device of this character, which may be readily transported from place to place and adjusted in elevation as required by the purposes for which it is intended to serve. Accordingly, the apparatus consists of a base on which is mounted a vertical upright. A pair of shelves or brackets are slidably mounted on the upright and carry a saw mechanism together with a motor for rotating the saw. By means of a convenient pulley and cable arrangement, the saw proper may readily be raised or lowered as required.

The invention is fully disclosed in the following description and in the accompanying drawings, in which:—

Figure 1 is a rear elevation of the device;

Figure 2 is a side elevation;

Figure 3 is a section on the line 3—3 of Figure 2;

Figure 4 is a plan view; and

Figure 5 is a section on the line 5—5 of Figure 4.

Reference to these views will now be made by use of like characters which are employed to designate corresponding parts throughout.

The device comprises a base 1 mounted on a plurality of casters 2 whereby it may be moved from place to place. If considerable cutting is done in the same plane, as through a row of carcasses, the rollers may be inserted in suitable tracks provided for the purpose.

On the base is mounted a vertical post 3 having a cross arm 4 at its upper end. The latter has pulleys 5 and 6 journaled in its ends for the purpose described below. A guide rod 7 extends from a point on the arm 4 adjacent the pulley 6 vertically downward to the base as illustrated in Figures 1 and 2. On the post are slidably mounted a lower shelf 8 and upper shelf 9 to which is secured a brace 10. The lower bracket carries a platform 11 on which is mounted an electric motor 12. To the ends of the shelves 8 and 9 is secured a saw guard 13 lying in a plane perpendicular to the shaft 14 of the motor. A counter-shaft 15 is journaled in the guard 13 of the saw 16. The shafts 14 and 15 are provided with pulleys 17 and 18 respectively which are operatively connected by a belt 19. The guard 13 is provided with handles 20 whereby the apparatus may be pushed from place to place. Also, the apparatus may be moved by means of a rail 21 disposed at the rear edge of the base 1.

Shelves 8 and 9 and parts associated therewith are balanced by a weight 22 slidable on the rod 7 and connected to the upper shelf by a cable 23 over the pulleys 5 and 6. The elevation of the saw is regulated by means of a drum 24 journaled in the rail 21. Pulleys 25 and 26 are mounted on the base 1 and a similar pulley 27 on the upper end of the post 3. Around the drum is wound a cable 28 which is passed over the pulleys 25, 26 and 27. The end depending directly from the upper pulley 27 is passed beyond the shelf 9 and secured to the shelf 8. While the remaining end is passed beyond the shelf 8 and secured to the shelf 9, as illustrated in Figure 5. When the saw is to be raised the upward pull on the cable acts on the lower shelf and vice versa, thereby preventing a tendency towards warping as regards the two brackets and the brace 15.

Adjustable legs 29 are threaded through the base and have at one end feet 30 adapted to engage the surface on which the apparatus rests. The upper end of each leg is in the form of a grip 31 for adjusting the same. By means of these devices the forward end of the base may be elevated to lift the forward casters from the surface, thereby preventing the device from rolling on the casters when it is desired to retain it in a stationary position.

While a specific embodiment of the invention has been illustrated and described, it is to be understood that various alterations in the details of construction may be made without departing from the spirit of the invention as indicated by the appended claim.

Having thus fully described the inven- tion, what we claim as new and desire to protect by Letters Patent is:—

A saw of the character described comprising a base, an upright mounted on said base, shelves slidably mounted on the upright, a saw guard secured to said shelves, a saw journaled in said guard, a motor mounted on one of the shelves and adapted to rotate said saw, and means for adjusting said shelves on the upright.

In witness whereof we have hereunto set our hands.

HERMENEGILDE BRIERE.
J. HORMISDAS GAGNIER.